US008608202B2

(12) United States Patent
Dossow

(10) Patent No.: US 8,608,202 B2
(45) Date of Patent: Dec. 17, 2013

(54) TANK MODULE FOR A MOTOR VEHICLE

(75) Inventor: Andreas Dossow, Bensheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 173 days.

(21) Appl. No.: 13/092,700

(22) Filed: Apr. 22, 2011

(65) Prior Publication Data

US 2011/0259933 A1    Oct. 27, 2011

(30) Foreign Application Priority Data

Apr. 24, 2010   (DE) .................. 10 2010 018 093

(51) Int. Cl.
*B60P 3/22* (2006.01)

(52) U.S. Cl.
USPC ........................................... 280/834

(58) Field of Classification Search
USPC .................. 280/834, 830; 220/23.2, 23.4
See application file for complete search history.

(56) References Cited

U.S. PATENT DOCUMENTS

| RE17,204 E | * | 2/1929 | Johnson ................. 220/23.4 |
| 2,661,982 A | * | 12/1953 | Hudson ................. 239/159 |
| 4,770,428 A | | 9/1988 | Sugiyama |
| 5,284,267 A | * | 2/1994 | Polletta et al. ........... 220/4.14 |
| 5,518,272 A | | 5/1996 | Fukagawa et al. |
| 5,577,630 A | * | 11/1996 | Blair et al. ............. 220/581 |
| 6,402,198 B2 | * | 6/2002 | Gollungberg ........... 280/830 |
| 6,418,962 B1 | * | 7/2002 | Wozniak et al. ......... 137/266 |
| 7,819,431 B2 | * | 10/2010 | Minami ................ 280/834 |
| 8,020,722 B2 | * | 9/2011 | Richards et al. ......... 220/584 |
| 2003/0189334 A1 | | 10/2003 | Kawasaki et al. |
| 2004/0160052 A1 | * | 8/2004 | Marsala et al. .......... 280/834 |
| 2006/0061081 A1 | * | 3/2006 | Kresse et al. ........... 280/834 |
| 2007/0119646 A1 | * | 5/2007 | Minami ................ 180/271 |
| 2008/0023957 A1 | | 1/2008 | Diehl |
| 2009/0090726 A1 | * | 4/2009 | Kawamata .............. 220/586 |
| 2009/0114467 A1 | | 5/2009 | Hoffman et al. |
| 2012/0161430 A1 | * | 6/2012 | Mulanon ............... 280/834 |

FOREIGN PATENT DOCUMENTS

| DE | 10132045 A1 | 1/2003 |
| DE | 102004030323 A1 | 1/2006 |
| DE | 202006019006 U1 | 2/2007 |
| DE | 102007034299 A1 | 4/2008 |
| DE | 202007015487 U1 | 3/2009 |
| JP | H0899542 A | 4/1996 |

OTHER PUBLICATIONS

German Patent Office, German Search Report for German Application No. 102010018093.9, dated Mar. 28, 2011.
UK IPO, British Search Report for Application No. 1106798.0, dated Aug. 5, 2011.

* cited by examiner

*Primary Examiner* — Tashiana Adams
(74) *Attorney, Agent, or Firm* — Ingrassia Fisher & Lorenz, P.C.

(57) ABSTRACT

A tank module is provided for a motor vehicle comprises at least two fuel tanks and a carrier body having concave flanks formed of sheet material and arranged between the fuel tanks and facing the fuel tanks.

14 Claims, 3 Drawing Sheets

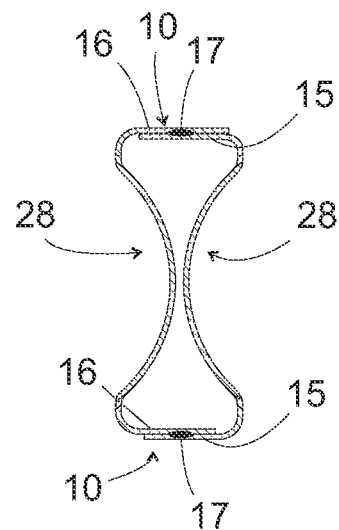
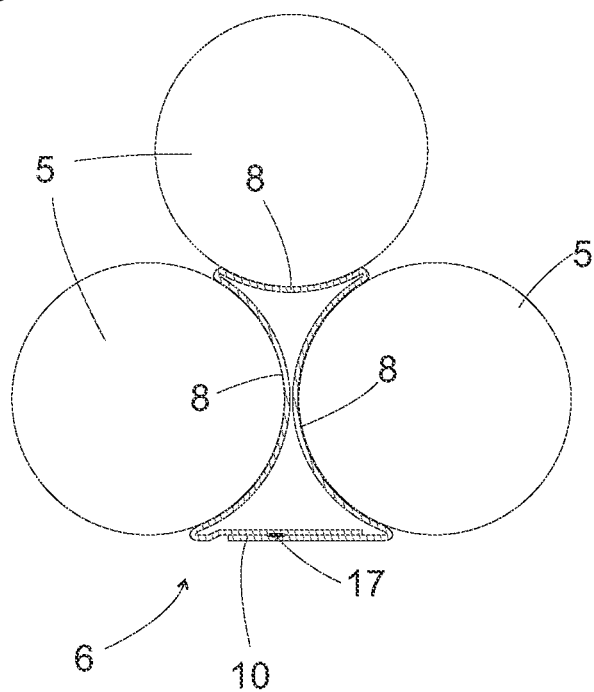

TANK MODULE FOR A MOTOR VEHICLE

CROSS-REFERENCE TO RELATED APPLICATION

This application claims priority to German Patent Application No. 102010018093.9, filed Apr. 24, 2010, which is incorporated herein by reference in its entirety.

TECHNICAL FIELD

The technical field relates to a tank module for installation in or on a motor vehicle, more preferably a tank module that can be filled with pressurized gas as fuel.

BACKGROUND

While a fuel tank for liquid fuel can largely assume any shape making possible an efficient utilization of existing hollow spaces or clearances of the body of the motor vehicle, the configuration possibilities with pressurized gas tanks are severely restricted by the necessity that the tank has to withstand a high internal pressure without being deformed. In order to guarantee the shape retention of a pressurized gas tank the latter should have a circular cross section in at least one section plane and an adaptation to a hollow space available for the tank with dimensions that are different in three space directions can substantially only take place in that a plurality of pressure vessels of substantially cylindrical shape, whose diameter and length in each case can be adapted to a first or a second dimension of the hollow space, are installed next to one another in a quantity adapted to the third dimension.

The installation of a plurality of pressurized gas tanks instead of a single tank requires increased work expenditure and is correspondingly expensive. In order to simplify the installation of the pressurized gas tank it has been suggested for example in DE 20 2007 015 487 U1 to combine two pressurized gas tanks and one carrier body having concave flanks facing the pressurized gas tanks into one tank module which as a single assembly can be mounted under the floor of a motor vehicle in a manner comparable to a tank.

The carrier body of this known tank module comprises an elongated rail which in the mounted state extends in a substantially triangular intermediate space delimited by the vehicle floor and the two pressurized gas tanks and from which two arms, which on both sides are provided with concave flanks, stand away downwards and engage through between the pressurized gas tanks. The fuel tanks are fixed to the carrier body with the help of clamping straps whose two ends in each case are anchored to the rail and of which in each case a middle portion is tightly screwed to a free lower end of the arms. The screw that tautens such a clamping strap has to be securely anchored at the end of the arm so as not to be torn loose through the tension of the strap and through the shocks acting on the pressurized gas tanks while driving. The considerable material thickness of the carrier body required for this does not only result in high material costs during the manufacture of the carrier body but also increases the fuel consumption of a vehicle on which the tank module is mounted. The conventional support body is manufactured through extrusion, wherein after the extrusion a material-removing machining is still required in order to obtain the final shape of the carrier body. This type of manufacture requires major effort, on the one hand because of the costs of the tools required for manufacturing the extruded profile and on the other hand due to the expensive subsequent machining.

At least one object is to create a tank module for a motor vehicle which is light in weight and inexpensive to manufacture. In addition, other objects, desirable features and characteristics will become apparent from the subsequent summary and detailed description, and the appended claims, taken in conjunction with the accompanying drawings and this background.

SUMMARY

A tank module is provided for a motor vehicle having at least two fuel tanks and a carrier body arranged between the fuel tanks and having concave surfaces facing the fuel tanks, the carrier body is formed of flat material. Shaping from flat material for example through roll forming or deep-drawing only requires simple, economical tooling and no time-consuming subsequent machining after the forming worth mentioning. Although it would be conceivable to form openings in the flat material to save weight provided these do not impair the stability of the carrier body, such openings however can be created on the flat sheet material, more preferably punched out, before the shaping of the carrier body with minimum expenditure of time and costs.

In order to create a cross-sectional shape that can be easily realized with sheet material the concave flanks of the carrier body are preferentially interconnected at their edges by webs. Edges of at least one sheet material cutting from which the carrier body is shaped are preferentially arranged in at least one of the webs and interconnected there. Preferentially one would use a single, more preferably strap-shaped cutting in order to form the carrier body from said cutting. If internal stresses make it difficult to tightly connect the edges of such a cutting with one another it is also possible to join a plurality of cuttings in a carrier body. A particularly quick and economical manufacture is possible if the edges are arranged in an overlapping manner and spot-welded together.

In order to prevent that inertial forces which during vehicle operation act on the tank module put a strain on the anchorage on the vehicle, preferentially not a web of the carrier body is directly fastened to the vehicle but the carrier body is mounted to the vehicle with the help of a mounting clamp which is fastened to the two webs of the carrier body. Through the fastening to both webs it is ensured that inertial forces acting on the tank module do not exert any bending moments on the carrier body that could lead to the deformation of the latter or which require a greater wall thickness of the carrier body in order to avoid a deformation. In other words, the mounting clamp allows that adequate stability of the tank module is achieved even with low wall thickness of the carrier body and accordingly low weight.

The mounting clamp in turn is preferentially connected to the vehicle via a mounting foot comprising a leg fastened to the mounting clamp and a leg standing away from the mounting clamp. This leg that stands away can be embodied substantially wider than the carrier body or the mounting clamp in that it protrudes over the fuel tank in longitudinal direction and accordingly is stable against bending moments attributable to inertial forces of the tank module.

Another contribution to the stability of the suspension of the tank module is that a connection between the mounting foot and the mounting clamp is arranged between the planes of the two webs substantially at the height of a narrowest point of the carrier body. This height approximately corresponds to the height of the centre of gravity of the tank module, so that on the connection between mounting foot and mounting clamp low rotational moments if any can occur.

Practically, at least one of the fuel tanks is fixed on the carrier body through at least one clamping strap wrapped about said carrier body. Preferentially, two clamping straps each are provided per fuel tank. The two ends of such a clamping strap are practically connected through a turnbuckle. The turnbuckle on the one hand allows accurate adaptation of the length of the clamping strap to the circumference of the fuel tank to be fixed. On the other hand, in that the turnbuckle is arranged between the two ends of the clamping strap, it is ensured that the clamping strap absorbs the entire tension built up with the help of the turnbuckle. For this reason the carrier body merely has to be designed strong enough in order to carry the weight of the fuel tank but not in order to additionally withstand the tension with which the fuel tanks are fixed, which in turn saves weight and costs.

The clamping strap practically wraps about a part of the carrier body and because of this holds the fuel tank and the carrier body tightly pressed against each other in the tensioned state. To this end, the clamping strap preferentially crosses two openings which are formed in the flank facing the fuel tank or, preferentially, on edges of said flank.

The tank module is mounted on a motor vehicle preferentially with carrier body oriented in vehicle transverse direction. This allows the efficient utilization of an installation space which has its greatest dimension in vehicle transverse direction in that the length of the fuel tank is adapted to this dimension. Preferred installation locations for the tank module are under a front seat row or behind a rear axle of the motor vehicle.

BRIEF DESCRIPTION OF THE DRAWINGS

The present invention will hereinafter be described in conjunction with the following drawing figures, wherein like numerals denote like elements, and:

FIG. 6 is a cross section of the carrier body according to a second embodiment; and FIG. 7 is a schematic cross section of a tank module with three fuel tanks.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
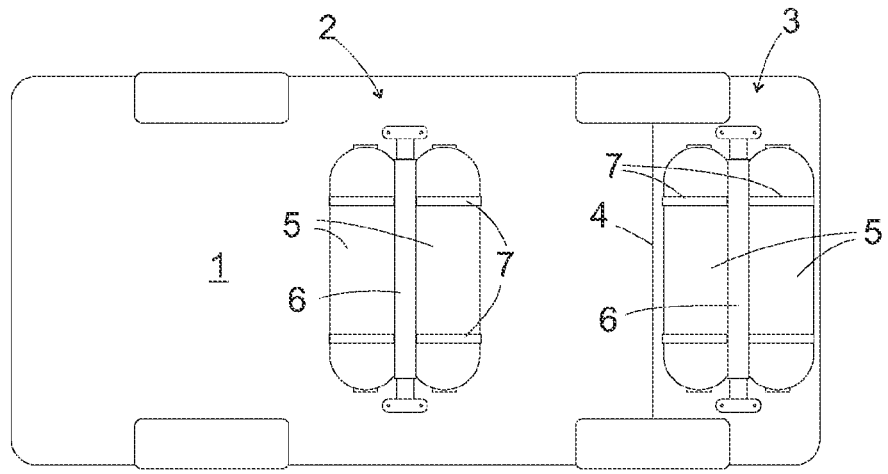
FIG. 1 is a schematic view from below of a motor vehicle with two tank modules according to an embodiment.

FIG. 1 shows a schematic bottom view of the floor 1 of a motor vehicle with two tank modules 2, 3 mounted thereon. The front one 2 of the two tank modules is located approximately below a front seat row of the vehicle, the rear tank module 3 behind a rear axle 4. Each tank module 2, 3 comprises two fuel tanks 5, each in the shape of a cylinder with dome-shaped face ends. Such fuel tanks 5 are particularly suitable for accommodating pressurized gas, in the case of a bivalent vehicle however one or a plurality of the fuel tanks 5 can be provided for accommodating fuel such as petrol or diesel fuel, ethanol or the like which are liquid under normal conditions.

Figure 2:
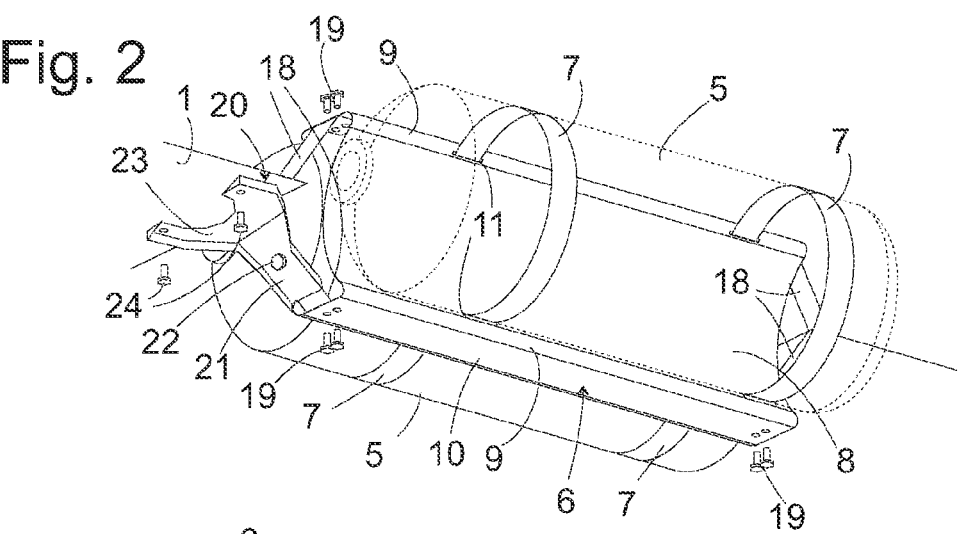
FIG. 2 is a perspective view of a tank module.

The construction of the tank modules 2 and 3 is more clearly evident in the perspective view of FIG. 2. Between the two fuel tanks 5 a carrier body 6 formed from a rectangular metal sheet cutting is located, on which the fuel tanks 5 in each case are fixed with the help of two clamping straps 7. The fuel tank 5 in FIG. 2 facing the beholder is shown transparently in order to be able to completely show the carrier body 6.

Figure 3:
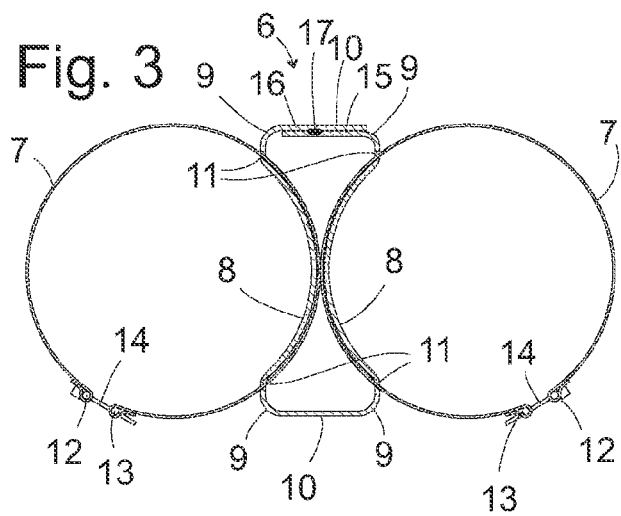
FIG. 3 is a cross section through the tank module according to an embodiment.

As is particularly evident in the cross section of FIG. 3 the carrier body 6 has two flanks 8 concave to the outside curved in the shape of an arc of a circle, whose curvature radius corresponds to the radius of the fuel tank 5. The concave flanks 8 are unitarily connected to two narrow horizontal webs 10 via convexly curved transition zones 9 at their upper and lower edges. On the upper and lower edge of the two concave flanks 8 two narrow slits 11 each are cut out, through which the clamping straps 7 pass. The ends of each clamping strap 7 are wrapped about two bolts 12, 13 transversely drilled through. A screw 14 freely extends through the bore of the bolt 12 and engages in an internal thread of the bore of the bolt 13. By turning the screw 14 the clamping strap 7 can thus be pulled taught round about the fuel tank 5. Although the tension of the clamping strap 7 establishes a close contact between the flank 8 of the carrier body 6 and the fuel tank 5 it does not however exert any pull on the carrier body 6 so that the latter is merely loaded by the weight of the fuel tank 5. As is additionally evident in FIG. 3 two edges 15, 16 of the metal sheet cutting from which the carrier body 6 is formed, overlap on the upper web 10. These are connected to each other via a plurality of spot welds 17 distributed in longitudinal direction of the web.

Again with respect to FIG. 2, two substantially v-shaped mounting clamps 18 are shown which engage in the open face ends of the carrier body 6 and are fastened to the ends of the two webs 10 by screws 19. On the mounting clamps 18 a leg 21 of an angled mounting foot 20 each is fastened with the help of an individual additional screw 22. A fork-shaped horizontal leg 23 of the mounting foot is fastened to the floor 1 by two screws 24. The screw 22 is arranged slightly below the waist of the carrier body 6 or below the centre of gravity of the tank module, so that inertial forces acting on the tank module can result in the occurrence of a rotational moment on the screw 22. However, this rotational moment is substantially smaller than one that would act on the supporting body if its upper web 10 were directly screwed to the vehicle floor. In addition, the oblique orientation of the legs 21 of the mounting feet 20 located opposite each other in mirror image obstructs a rotation of the tank module 2 about an axis running through the two screws 22.

Figure 4:
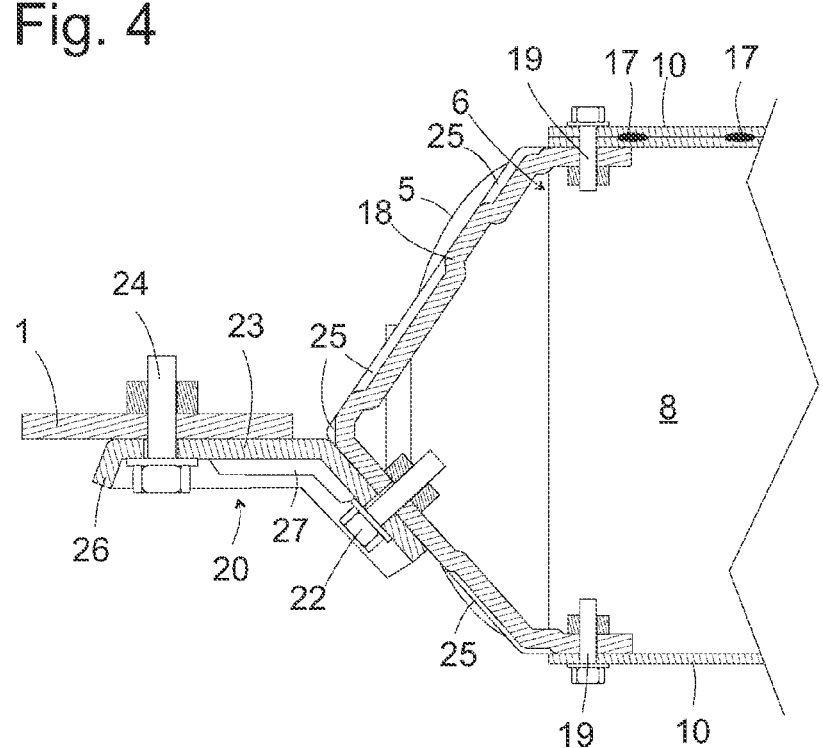
FIG. 4 is a partial longitudinal section of the carrier body and of components connecting said carrier body to the vehicle floor.

FIG. 4 shows the same circumstance enlarged in a partial longitudinal section. The mounting clamp 18 and the mounting foot 20 both have a greater material thickness than the cutting from which the carrier body 6 is formed. In addition, the mounting clamp 18 is stiffened through a plurality of beads 25 and the mounting foot 20 is stiffened through an angled-off outer edge 26 and beads 27 located outside the sectional plane.

The region of the floor 1 on which the mounting foot 20 is fastened is located approximately at the height of the waist of the carrier body 6 or the longitudinal axis of the fuel tanks 5 in FIG. 4. The floor 1 therefore has to have an indentation which is not shown in FIG. 4 in which the tank module 2 partially engages. This region of the floor 1 however need not be loadable since the tank module 2 is exclusively anchored via the mounting feet 20.

Figure 5:
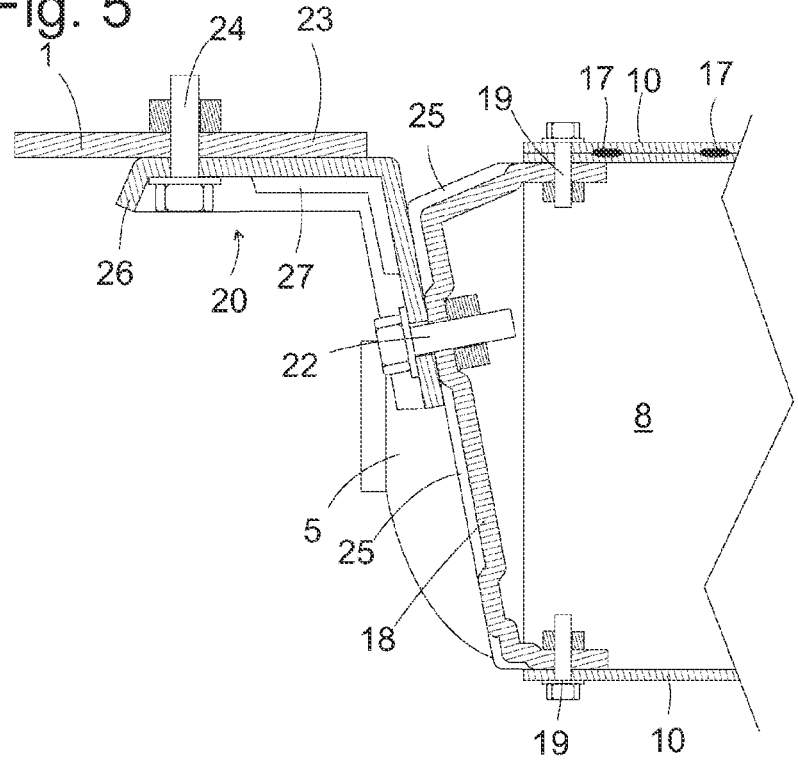
FIG. 5 is a partial longitudinal section similar to FIG. 4 according to a modified embodiment.

FIG. 5 shows a section similar to FIG. 4 in the case of the rear tank module 3. Here, the proportions of the mounting foot 20 and of the mounting clamp 18 are changed in order to anchor the tank module 3 on a region of the floor 1 which is located higher than in the case shown in FIG. 4. The screw 22 connecting the mounting clamp 18 to the mounting foot 20 in this case is located approximately at the height of the waist of the carrier body 6, so that despite the almost vertical orientation of the leg 21, inertial forces acting on the tank module 3 do not result in a rotation. Rotational moments occurring at the height of the screws 24 are absorbed by the large width of the leg 23 and the spacing of the screws 24 from each other.

FIG. 6 shows a cross section through the carrier body 6 according to an alternative configuration. Here, the carrier body 6 is joined from two identical cuttings 28 of which each comprises a concave flank 8, the transition zones 9 adjoining thereon and two edge strips 15, 16 which are welded together by pairs in order to form the webs 10. The elements 28 are simpler to form than the unitary carrier body 6 of FIG. 3, so that the carrier body of FIG. 6 despite the additional expenditure in terms of material for the edge strips 15, 16 also overlapping on the lower web 10 possibly can be manufactured more cost-effectively. Since the elements 28 do not have a closed cross section, not only roll forming but also deep-drawing techniques are possible.

A tank module according to an embodiment can also comprise more than two fuel tanks 5. Even without figure it can be understood that for example three fuel tanks 5 can be joined into a tank module with the help of two carrier bodies 6 of the type shown in FIG. 3 or FIG. 6 located in between. However it is also possible to realize more than two concave flanks 8 on a carrier body 6 as is exemplarily shown in FIG. 7 for a tank module having three fuel tanks 5.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope s set forth in the appended claims and their legal equivalents.

What is claimed is:

1. A tank module for a motor vehicle, comprising:
   at least two fuel tanks; and
   a carrier body that is formed of sheet metal and having concave flanks facing the at least two fuel tanks and arranged between the at least two fuel tanks, wherein the concave flanks at edges are interconnected through webs, and wherein a mounting clamp is fastened to at least two of the webs.

2. The tank module according to claim 1, wherein in at least one of webs of at least one sheet material cutting from are interconnected.

3. The tank module according to claim 2, wherein the edges are arranged in an overlapping manner and spot-welded together.

4. The tank module according to claim 1, wherein a mounting foot comprises a leg fastened to the mounting clamp and a second leg standing away from the mounting clamp.

5. The tank module according to claim 4, wherein a connection between the mounting foot and the mounting clamp is arranged between planes of the at least two of the webs substantially at a height of a narrowest point of the carrier body.

6. The tank module according to claim 1, wherein a wall thickness of the carrier body is smaller than a second wall thickness of the mounting clamp.

7. The tank module according to claim 4, wherein a wall thickness of the carrier body is smaller than a second wall thickness of the mounting foot.

8. The tank module according to claim 1, wherein at least one of the at least two fuel tanks is fixed on the carrier body through a clamping strap wrapped about the at least one of the at least two fuel tanks.

9. The tank module according to claim 8, wherein two ends of the clamping strap are interconnected through a turnbuckle.

10. The tank module according to claim 8, wherein the clamping strap additionally is wrapped about a part of the carrier body.

11. The tank module according to claim 10, wherein the clamping strap is configured to cross two openings that are formed in one of two concave flanks facing another one of the at least two fuel tanks.

12. The tank module according to claim 10, wherein the clamping strap is configured to cross two openings formed in one of two concave flanks that face edges of two concave flanks.

13. The tank module according to claim 1, wherein the tank module is mounted under a front seat row or behind a rear axle.

14. The tank module according to claim 1, wherein the tank module is mounted behind a rear axle.

* * * * *